United States Patent [19]

Green et al.

[11] Patent Number: 4,973,399

[45] Date of Patent: Nov. 27, 1990

[54] CATALYTIC CRACKING OF HYDROCARBONS

[75] Inventors: Gary J. Green, Yardley, Pa.; David S. Shihabi, Pennington, N.J.; Tsoung Y. Yan, Philadelphia, Pa.

[73] Assignee: Mobil Oil Corporation, Fairfax, Va.

[21] Appl. No.: 454,475

[22] Filed: Dec. 21, 1989

Related U.S. Application Data

[63] Continuation-in-part of Ser. No. 433,407, Nov. 3, 1989, which is a continuation of Ser. No. 279,612, Dec. 5, 1988, abandoned.

[51] Int. Cl.$^5$ ............................................. C10G 11/05
[52] U.S. Cl. ..................................... 208/120; 208/121; 208/149; 208/254 R; 423/239; 502/41; 502/67
[58] Field of Search ................... 208/120, 121, 254 R, 208/52 H, 149; 423/235, 239; 502/41, 67

[56] References Cited

U.S. PATENT DOCUMENTS

| | | | |
|---|---|---|---|
| 3,140,253 | 7/1964 | Plank et al. ........................ | 208/120 |
| 4,199,435 | 4/1980 | Chessmore et al. ................ | 208/113 |
| 4,521,389 | 6/1985 | Blanton, Jr. et al. ............... | 423/235 |
| 4,609,537 | 9/1986 | Tolpin et al. ....................... | 423/239 |
| 4,778,665 | 10/1988 | Krishnamurthy .................. | 423/239 |
| 4,798,813 | 1/1989 | Kato et al. .......................... | 423/239 |
| 4,812,430 | 3/1989 | Child .................................. | 208/113 |
| 4,812,431 | 3/1989 | Child .................................. | 208/120 |
| 4,855,115 | 8/1989 | Imanari et al. ..................... | 423/239 |

*Primary Examiner*—Anthony McFarlane
*Attorney, Agent, or Firm*—Alexander J. McKillop; Charles J. Speciale; Malcolm D. Keen

[57] ABSTRACT

Emission of noxious nitrogen oxides with the flue gas from the regenerator of a fluid catalytic cracking plant are reduced by incorporating into the circulating inventory of cracking catalyst separate additive particles that contain a copper-loaded zeolite. A particularly effective additive is provided, for example, by treating a ZSM-5 zeolite in a matrix consisting predominantly of titania, zirconia or a mixture thereof with a solution containing both copper and rare earth cations to incorporate both of these elements with the zeolitic composition.

8 Claims, 5 Drawing Sheets

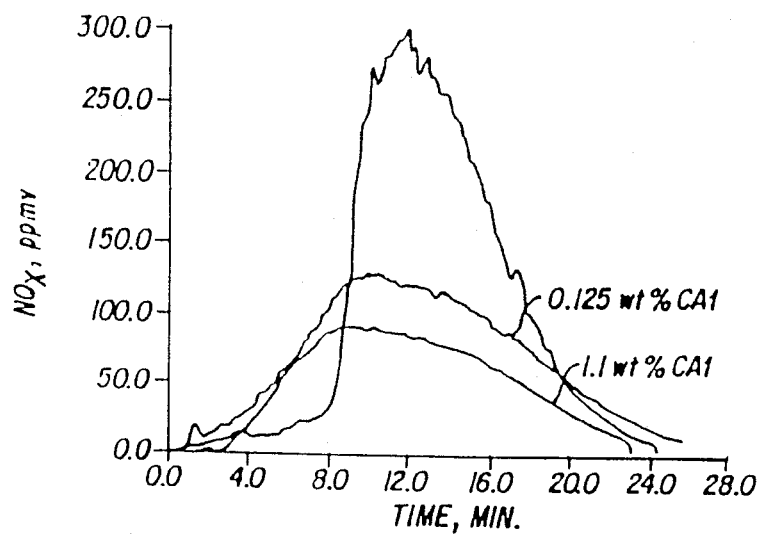
FIG. 2 EXAMPLE 8 - NO$_X$ REDUCTION
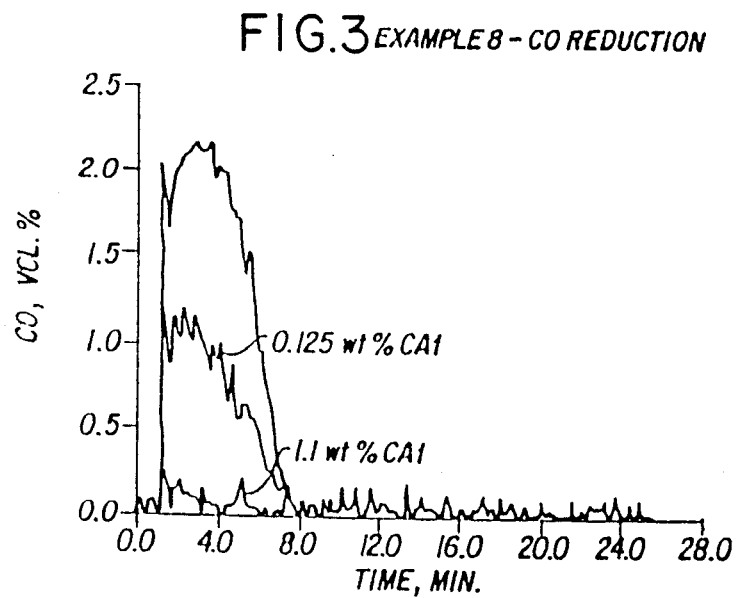
FIG. 3 EXAMPLE 8 - CO REDUCTION

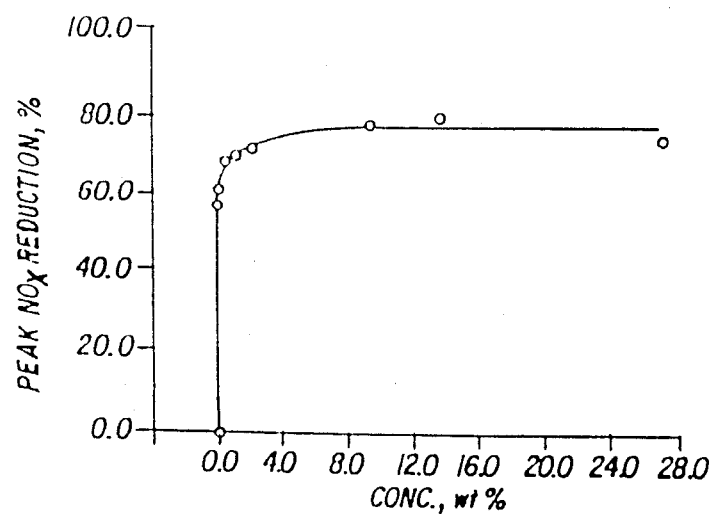
FIG. 4 EXAMPLE 8 - EFFECT OF CA1 CONC.
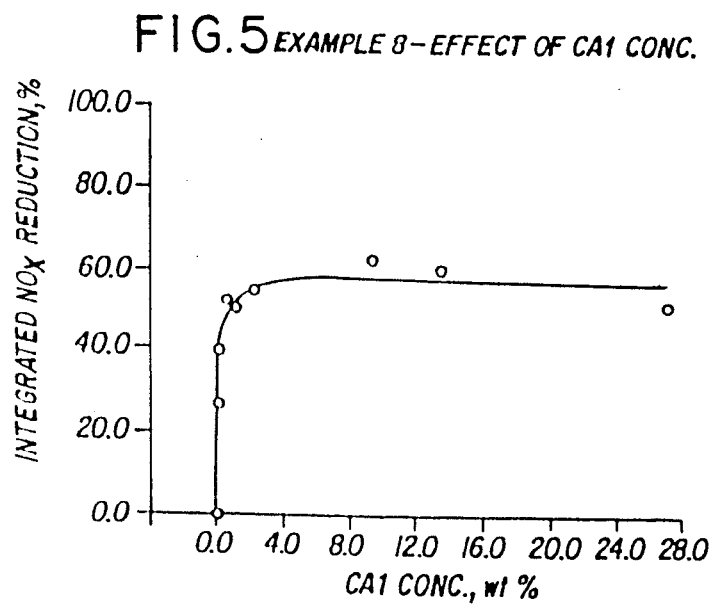
FIG. 5 EXAMPLE 8 - EFFECT OF CA1 CONC.

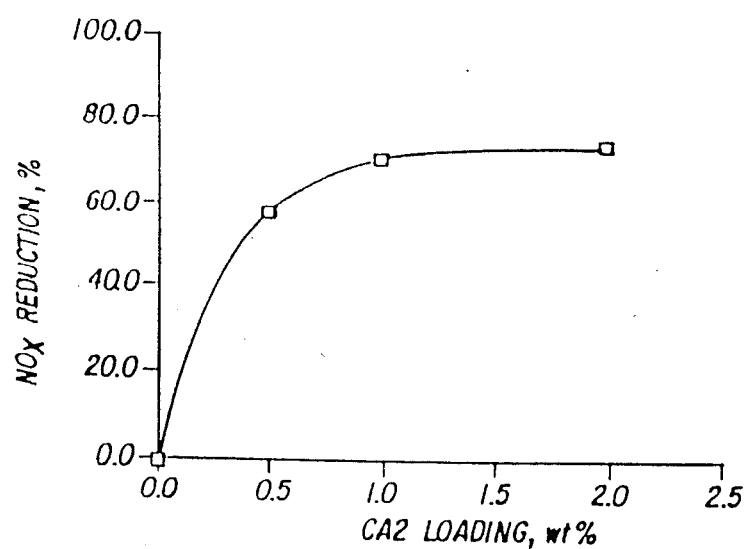
FIG. 6 EXAMPLE 9 STEADY-STATE REGENERATION

CATALYTIC CRACKING OF HYDROCARBONS

CROSS REFERENCE TO RELATED APPLICATIONS

This application is a continuation-in-part of copending U.S. patent application, Ser. No. 07/433,407 filed 3 Nov., 1989, now pending, which is turn is a continuation under 37 CFR 1.62 of U.S. patent application Ser. No. 07/279,612 filed Dec. 5, 1988, now abandoned.

FIELD OF THE INVENTION

This invention is related to catalytic cracking of hydrocarbons. It more particularly refers to a novel cracking catalyst that, when regenerated, produces a flue gas with ecologically acceptable concentration of carbon monoxide and noxious nitrogen oxides. It further refers to a novel catalytic cracking process which produces a flue gas with little or no content of noxious nitrogen oxides and CO.

BACKGROUND OF THE INVENTION

In recent years there has been an increased concern in the United States and elsewhere about air pollution from industrial emissions of noxious oxides of nitrogen, sulfur and carbon. Government agencies, in response to such concerns, have in some cases already placed limits on allowable emissions of one or more of the pollutants, and the trend is clearly in the direction of increasingly stringent restrictions. Petroleum fuel refineries are particularly affected by present and anticipated restrictions on emissions, particularly emissions of nitrogen oxides and carbon monoxide. Catalytic cracking, a major petroleum refinery process, is the largest single source of nitrogen oxides in such refineries.

Fluid catalytic cracking of petroleum hydrocarbons to lower molecular weight products is a well known process. This process is practiced industrially in a cyclic mode wherein hydrocarbon feedstock is contacted with hot, active, solid particulate catalyst and without added hydrogen at rather low pressures of up to about 50 psig and temperatures sufficient to support the desired cracking. As the hydrocarbon feed is cracked to more valuable and desirable products, "coke" is deposited on the catalyst particles. It should be noted that substantially all of the organic nitrogen in the feedstock to the cracker is incorporated with the coke deposit. The coked catalyst particles are disengaged from the hydrocarbon products and contacted with an oxygen containing gas in a regenerator whereupon coke is burned away from the particles to regenerate their catalytic activity. The heated, regenerated catalyst particles are then returned to the cracking zone and contacted with additional hydrocarbon feed and the cycle is repeated. The phrase "circulating inventory of cracking catalyst" as used herein includes the total catalyst contained in the cracking and regenerator sections of the cracking plant, including transfer lines, standpipe, etc.

In general, when coke is burned with a deficiency of oxygen, the regenerator flue gas has a high CO/CO$_2$ ratio and a low level of nitrogen oxides, but when burned with excess oxygen, the flue gas has a high level of such nitrogen oxides and a reduced CO content. Thus, catalytic cracking regenerators emit CO, or nitrogen oxides, or mixtures of these pollutants with the flue gas in varying quantities, depending on feed quality, mode of operation of the regenerator, etc.

Although several nitrogen oxides are known which are relatively stable at ambient conditions, it is generally recognized that two of these, viz. nitric oxide (NO) and nitrogen dioxide (NO$_2$), are the principal contributors to smog and other undesirable environmental effects when they are discharged into the atmosphere. These effects will not be discussed further here since they are well recognized.

Nitric oxide and nitrogen dioxide, under appropriate conditions, are interconvertible according to the equation $$2NO + O_2 = 2NO_2.$$

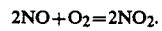

For purposes of the present invention, NO$_x$ will be used herein to represent nitric oxide, nitrogen dioxide (the principal noxious oxides of nitrogen), and/or mixtures thereof.

U.S. Pat. No. 3,900,554 to Lyon describes a homogeneous gas phase thermal reaction to remove NO$_x$ from combustion effluent by adding 0.4 to 10 moles (preferably 0.5 to 1.5 moles) of ammonia followed by heating to 1600° C. to 2000° C. The NO$_x$ content is lowered as a result of its being reduced to nitrogen by reaction with ammonia. The so-called "selective catalytic reduction" type process which operates at a much lower temperature, 200° to 600° C., is exemplified by U.S. Pat. No. 4,220,632 to Pence et al., which describes a process for reducing NO$_x$ from a fossil fuel fired power generation plant, or from other industrial plant off-gas stream, to elemental nitrogen and/or innocuous nitrogen oxides by employing ammonia as reductant and, as catalyst, the hydrogen or sodium form of a zeolite having pore openings of about 3 to 10 Angstroms.

When incomplete combustion of coke in the regenerator of a fluid catalytic cracking plant leaves a significant amount of carbon monoxide (CO) in the flue gas, such flue gas not only emits CO to the atmosphere, but also tends to sporadically burn (by reaction of CO with residual oxygen) in ducts and flues of the plant (afterburning), damaging these structures by excessive temperatures. It is now known that trace amounts of a platinum group metal, such as 1.0 parts per million of platinum incorporated with the cracking catalyst, effectively catalyzes the complete burning of carbon monoxide to carbon dioxide in the regenerator without detriment to the cracking reaction. This development simultaneously eliminated the environmental problem and the problem of sporadic afterburning, and has been very widely accepted by refiners. Such catalysts and their use are described in U.S. Pat. Nos. 4,251,395, 4,265,787, 4,088,568, 4,072,600, 4,093,535 and 4,159,239, all to Schwartz, and are incorporated herein by reference for further details on composition and use. As described therein, such promoted catalysts may be used to completely burn CO (referred to hereinbelow as "full CO-combustion") or to only partially burn the CO (referred to hereinbelow as "partial CO-combustion") by the simple expedient of limiting the oxygen supplied to the regenerator. The term "Pt group metal CO-oxidation promoter" as used herein means those metals and their mode of use as taught by the Schwartz patents cited above. Operation with CO-combustion promoters, which solves the CO emissions problem, can in some instances increase the NO$_x$ emissions.

Although most petroleum cracking is conducted with fluid beds, non-fluid catalyst beds also may be used. Such processes also are operated continuously and in cyclic fashion, with movement of the catalyst against gravity being effected, as needed, pneumatically or mechanically. One typical example of industrially practiced moving bed hydrocarbon catalytic cracking is known as Thermofor Catalytic Cracking (TCC). In this process the catalyst is in the shape of beads or pellets having an average particle size of about 1/64 to ¼ inch, preferably about ⅛ inch. In contrast with these particles, in fluid catalytic cracking (FCC) the catalyst is a fine powder of about 10 to 200 microns, preferably about 70 micron size. The problems encountered with $NO_x$ and CO emissions in fluid catalytic cracking exist also with the moving bed type processes. Although the description herein, for simplicity, is couched in terms of fluid catalytic cracking, it is contemplated that the invention encompasses both fluid and moving-bed type processes.

The catalysts used in endothermic nonhydrogenative cracking are to be distinguished from catalysts used in exothermic hydrocracking. Operating conditions also are different. While the catalytic cracking processes to which this invention is directed operate at low pressures near atmospheric and in the absence of added hydrogen, hydrocracking is operated with added hydrogen at pressures of up to about 1000 to 3000 psig. Further, nonhydrogenative catalytic cracking is a reflexive process with catalyst cycling between cracking and regeneration (coke burn off) over a very short period of time, such as seconds or minutes. In hydrocracking, on the other hand, a fixed bed of catalyst usually remains in cracking service for months between regeneration. Another important difference is in the product. Nonhydrogenative catalytic cracking produces a highly unsaturated product with substantial quantities of olefins and aromatics, and a high octane gasoline fraction. Hydrocracking, in contrast, produces an essentially olefin-free product and a relatively low octane gasoline. The present invention is not directed to hydrocracking nor is it within the scope of this invention to use hydrocracking catalysts.

We have now found that $NO_x$ emissions formed in cracking catalyst regeneration can be dramatically reduced or eliminated without resorting to the very high temperatures required for the gas phase thermal reaction with $NH_3$, and without adding ammonia at all, and without providing expensive downstream facilities to clean up the flue gas.

It is an object of this invention to provide a novel cracking catalyst composition which reduces emissions of $NO_x$ and/or CO from the regenerator of a fluid catalytic cracking plant.

It is a further object to provide an improved fluid catalytic cracking process that utilizes such catalyst.

It is a further object of this invention to provide a means for reducing $NO_x$ emissions when operating a fluid catalytic cracking plant in the full CO-burning mode.

These and other objects of this invention will become apparent from this entire specification including the appended claims.

BRIEF DESCRIPTION OF THE DRAWING

FIG. 2. Illustrates $NO_x$ reduction, Example 8.

FIG. 3. Illustrates CO reduction, Example 8.

FIG. 4. Illustrates effect of additive concentration on peak $NO_x$ reduction, Example 8.

FIG. 5. Illustrates effect of additive concentration on integrated $NO_x$ reduction, Example 8.

FIG. 6. Illustrates effect of additive concentration on continuous regeneration.

BRIEF SUMMARY OF THE INVENTION

Figure 1A:
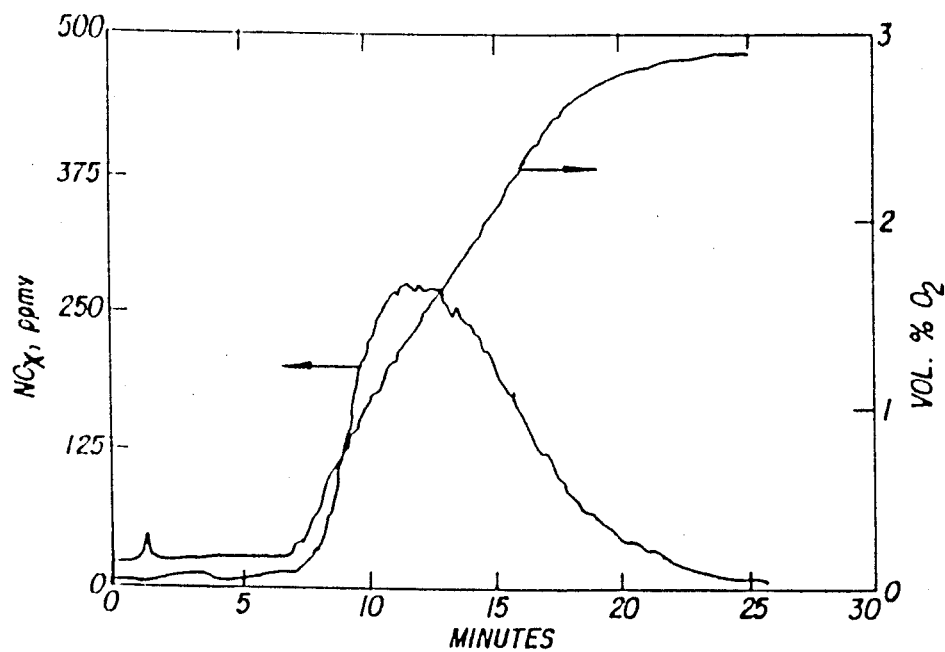
FIG. 1(A), 1(B). Effluent Species Profiles, Regeneration of Coked FCC Catalyst Without Additive.

This invention provides a novel means for reducing or eliminating the emission of $NO_x$ with a flue gas from the regenerator of a catalytic cracking plant. This is accomplished by incorporating into the circulating catalyst inventory of a catalytic cracking unit an amount of additive particles comprising a highly siliceous crystalline zeolite, said zeolite preferably having the crystal structure of ZSM-5, ZSM-11, ZSM-12, ZSM-22, ZSM-23, ZSM-35, ZSM-38, ZSM-48, mordenite, dealuminated Y or Zeolite Beta and a silica to alumina ratio of 20 to 100, said zeolite containing copper metal or ions preferably equivalent to at least one half mole of CuO for each mole of $Al_2O_3$ in said zeolite, with said amount of additive particles constituting 0.1 to 30 wt%, and preferably 0.1 to 10 wt% of said circulating inventory including additive.

The advantage of the method of this invention is its simplicity: no modification of the catalytic cracking equipment is required, nor is there any necessity for expensive downstream facility such as would be required in the downstream treatment of the flue gas to reduce its $NO_x$ content. As will be shown hereinbelow, the invention also is effective to reduce carbon monoxide emissions. It is also contemplated that gasoline octane will also be somewhat improved by the use of a preferred embodiment of this invention.

This invention also provides a novel cracking catalyst which may be prepared in situ as described above; or, alternatively, as a preformed mixture of conventional cracking catalyst and the additive comprising the highly siliceous zeolite that contains copper or copper ion.

DESCRIPTION AND PREFERRED EMBODIMENTS

The cracking catalyst composition of this invention consists of 99.9 to 70.0 wt% of a solid acidic cracking catalyst, herein referred to as the host catalyst, and 0.1 to 30.0 wt% of additive particles. A preferred range for the host catalyst is 99.9 to 90.0 wt% with 0.1 to 10.0 wt% of additive particles.

As host catalyst, any solid acidic cracking catalyst free of added copper may be used, including amorphous catalysts such as those based on silica alumina and silica magnesia, for example. The term "added copper" means copper deliberately added by impregnation or ion-exchange, and excludes copper which may be acquired from trace amounts in the feed, for example.

The preferred host catalyst is one prepared, for example, by compositing a major portion of amorphous catalyst with a minor portion of an active crystalline aluminosilicate zeolite. Catalysts of this type for FCC and TCC are described in U.S. Pat. Nos. 3,140,249 and 3,140,253, the disclosures of which are hereby incorporated by reference. The active crystalline aluminosilicate component of such catalysts, usually a large pore zeolite of the faujasite crystal type, imparts high activity with very good selectivity to the cracking catalyst. Such catalysts have become very widely used in fluid catalytic cracking, supplanting the older amorphous synthetic silica-alumina catalysts almost completely. The term "zeolite cracking catalyst" as used herein means a catalyst essentially of the type described in U.S. Pat. Nos. 3,140,249 and 3,140,253, and variants thereof, such as those which also include a ZSM-5 type zeolite, exemplified by U.S. Pat. Nos. 3,758,403; 4,309,279; and 4,309,280, all of which are included herein by reference.

The additive employed with the host catalyst is prepared from a highly siliceous crystalline zeolite having a silica to alumina ratio of 20:1 to 100:1 and a pore size of about 5 to 13 Angstroms. The preferred highly siliceous zeolites useful for this purpose include ZSM-5, ZSM-11, ZSM-12, ZSM-22, ZSM-23, ZSM-35, ZSM-38, ZSM-48, mordenite, dealuminated Y and Zeolite Beta, all of which are known.

U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-22 is more particularly described in U.S. Pat. No. 4,481,177, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

ZSM-48 is more particularly described in U.S. Pat. No. 4,397,827, the entire content of which is incorporated herein by reference.

Zeolite Beta is more particularly described in U.S. Pat. No. 3,308,069, the entire content of which is incorporated herein by reference.

For purposes of this invention, any of the described zeolites may be used as such as the starting material. Alternatively, the zeolite may be incorporated in a binder (matrix) such as silica, silica alumina, alumina, clay or other known inorganic binder, and used in this form as the starting material. Regardless of whether the zeolite is in pure form or incorporated in a matrix, it is preferred that it be in the hydrogen, ammonium, or sodium form prior to loading with metals as described hereinbelow. If in a matrix, it is bound and shaped to match the particle size and approximate density of the host catalyst.

Copper may be introduced into the zeolite by the use of any soluble copper salt, preferably one which provides cupric ions. We have found cupric acetate and cupric nitrate to be useful for purposes of this invention, but cupric chloride and cupric sulfate also may be used. Ion-exchange techniques, as shown in the examples, provide catalytically effective copper. However, as will be illustrated by example, effective loading is also obtained when the copper is introduced by impregnation of the zeolite with an aqueous solution of the copper salt.

In a preferred embodiment and best mode for making this invention, a steam stabilizing amount of titanium or zirconium or a mixture thereof is included in the additive by treatment of the zeolite with any titanium or zirconium compound that can be brought into intimate association with the zeolite. We have found that highly effective results are obtained with the use of aqueous solutions of titanium tetramethoxide and zirconium acetate, and, such materials being readily available, are preferred. As will be illustrated by example, the introduction of titanium or zirconium compound is effective when done by impregnation of the zeolite. The introduction of titanium or zirconium may follow ion-exchange by cupric ion, but it also may be done concurrently therewith with an aqueous solution containing, for example, both divalent copper cations and a soluble titanium or soluble zirconium compound. It is also contemplated to load the zeolite with titanium or zirconium compound prior to introduction of copper. An amount of the stabilizing metal equal to 1 to 20 wt% of the total additive is effective.

As a final step in preparation of the zeolitic copper additive of this invention, the dried catalyst is calcined in air for about 1-4 hours to decompose organic matter and fix the titanium and/or zirconium in the composition as an inorganic compound. Suitable calcination temperatures are 500° to about 600° C.

The catalyst composition of this invention may be prepared as a preformed mixture of host catalyst and additive and the mixture added to the cracking unit as initial fill or as makeup catalyst. It also may be prepared in situ by introduction of the additive to the circulating inventory of host catalyst in the cracking unit, this latter method being preferred. The point of introduction into the system may be the same as used for adding makeup host catalyst, but it may be at some other place.

The improved process of this invention is provided by incorporating into the circulating catalyst inventory of an FCC unit an amount of additive particles described above, said amount of additive particles constituting 0.1 to 30 wt%, and preferably 0.1 to 10 wt% of said circulating inventory including additive.

Figure 7:
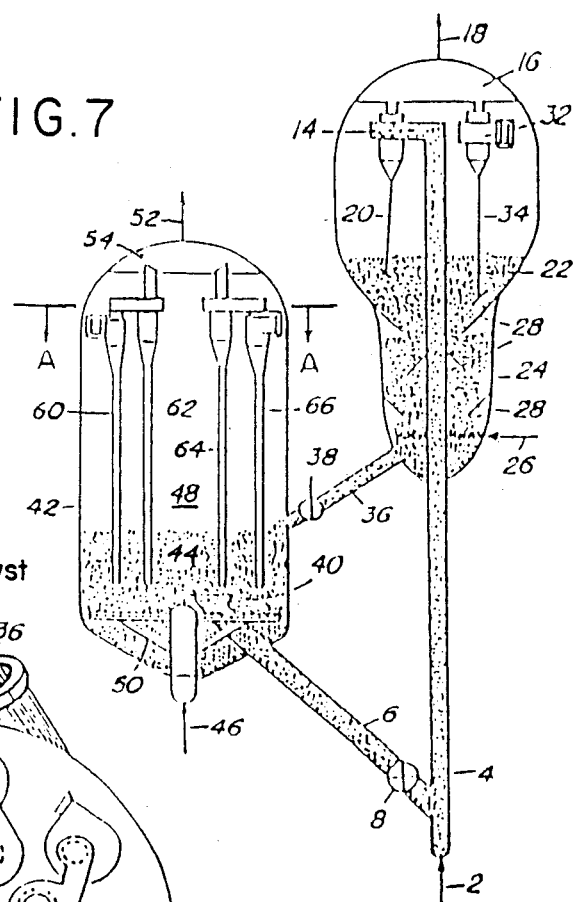
FIG. 7. Exemplifies a fluid catalytic cracking apparatus.
Figure 8:
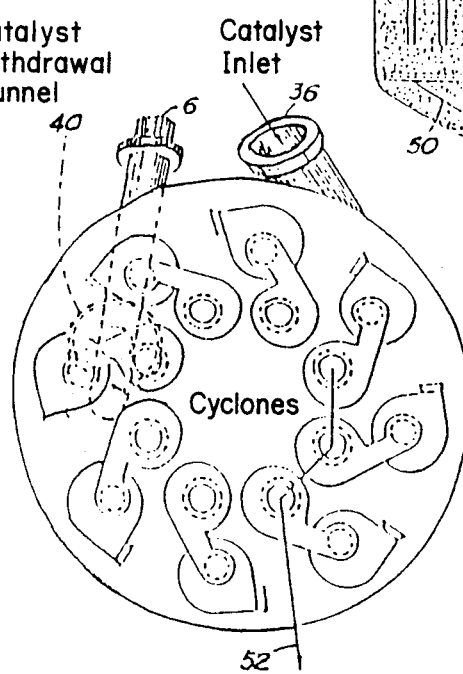
FIG. 8. Illustrates a swirl regenerator.

FIG. 7 and the sectional element thereof shown in FIG. 8 are representative of a commercial fluid catalytic cracking unit. Referring now to FIG. 7, a hydrocarbon feed 2 such as a gas oil boiling from about 600 degrees F. up to 1000 degrees F. is passed after preheating thereof to the bottom portion of riser 4 for admixture with hot regenerated catalyst introduced by standpipe 6 provided with flow control valve 8. A suspension of catalyst in hydrocarbon vapors at a temperature of at least about 950 degrees F. but more usually at least 1000 degrees F. is thus formed in the lower portion of riser 4 for flow upwardly therethrough under hydrocarbon conversion conditions. The suspension initially formed in the riser may be retained during flow through the riser for a hydrocarbon residence time in the range of 1 to 10 seconds.

The hydrocarbon vapor-catalyst suspension formed in the riser reactor is passed upwardly through riser 4 under hydrocarbon conversion conditions of at least 900 degrees F. and more usually at least 1000 degrees F. before discharge into one or more cyclonic separation zones above the riser discharge, represented by cyclone separator 14. There may be a plurality of such cyclone separator combinations comprising first and second cyclonic separation means attached to or spaced apart from the riser discharge for separating catalyst particles from hydrocarbon vapors. Separated hydrocarbon vapors are passed from separator 14 to a plenum chamber 16 for withdrawal therefrom by conduit 18. These hydrocarbon vapors together with gasiform material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper portion of riser conversion zone 4. Catalyst bed 22 is maintained as downwardly moving fluid bed of catalyst countercurrent to rising gasiform material. The catalyst passes downwardly through a stripping zone 24 immediately below and counter-current to rising stripping gas introduced to a lower portion thereof by conduit 26. Baffles 28 are provided in the stripping zone to improve the stripping operation.

The catalyst is maintained in stripping zone 24 for a period of time sufficient to effect a higher temperature desorption of feed deposited compounds which are then carried overhead by the stripping gas. The stripping gas with desorbed hydrocarbons pass through one or more cyclonic separating means 32 wherein entrained catalyst fines are separated and returned to the catalyst bed 22 by dipleg 34. The hydrocarbon conversion zone comprising riser 4 may terminate in an upper enlarged portion of the catalyst collecting vessel with the commonly known bird cage discharge device, or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension. Vapors less encumbered with catalyst fines may then pass through one or more cyclonic separation means before passing to a product separation step. In any of these arrangements, gasiform materials comprising stripping gas hydrocarbon vapors and desorbed sulfur compounds are passed from the cyclonic separation means represented by separator 32 to a plenum chamber 16 for removal with hydrocarbon products of the cracking operation by conduit 18. Gasiform material comprising hydrocarbon vapors is passed by conduit 8 to a product fractionation step not shown. Hot stripped catalyst at an elevated temperature is withdrawn from a lower portion of the stripping zone by conduit 36 for transfer to a fluid bed of catalyst being regenerated in a catalyst regeneration zone. Flow control valve 38 is provided in transfer conduit 36.

This type of catalyst regeneration operation is referred to as a swirl type of catalyst regeneration due to the fact that the catalyst bed tends to rotate or circumferentially circulate about the vessel's vertical axis and this motion is promoted by the tangential spent catalyst inlet to the circulating catalyst bed. Thus, the tangentially introduced catalyst at an elevated temperature is further mixed with hot regenerated catalyst or catalyst undergoing regeneration at an elevated temperature and is caused to move in a circular or swirl pattern about the regenerator's vertical axis as it also moves generally downward to a catalyst withdrawal funnel 40 (sometimes called the "bathtub") adjacent the regeneration gas distributor grid. In this catalyst regeneration environment, it has been found that the regeneration gases comprising flue gas products of carbonaceous material combustion tend to move generally vertically upwardly through the generally horizontally moving circulating catalyst to cyclone separators positioned above the bed of catalyst in any given vertical segment. As shown by FIG. 2, the catalyst tangentially introduced to the regenerator by conduit 36 causes the catalyst to circulate in a clockwise direction in this specific embodiment. As the bed of catalyst continues its circular motion some catalyst particles move from an upper portion of the mass of catalyst particles suspended in regeneration gas downwardly therethrough to a catalyst withdrawal funnel 40 in a segment of the vessel adjacent to the catalyst inlet segment. In the regeneration zone 42 housing a mass of the circulating suspended catalyst particles 44 in upflowing oxygen containing regeneration gas introduced to the lower portion thereof by conduit distributor means 46, the density of the mass of suspended catalyst particles may be varied by the volume of regeneration gas used in any given segment or segments of the distributor grid. Generally speaking, the circulating suspended mass of catalyst particles 44 undergoing regeneration with oxygen containing gas to remove carbonaceous deposits by burning will be retained as a suspended mass of swirling catalyst particles varying in density in the direction of catalyst flow and a much less dense phase of suspended catalyst particles 48 will exist above 44 in the upper portion of the regeneration zone. Under carefully selected relatively low regeneration gas velocity conditions, a rather distinct line of demarcation may be made to exist between a dense fluid bed of suspended catalyst particles and a more dispersed suspended phase (dilute phase) of catalyst above it. However, as the regeneration gas velocity conditions are increased there is less of a demarcation line and the suspended catalyst passes through regions of catalyst particle density generally less than about 30 lbs. per cu. ft. A lower catalyst bed density of at least 20 lb/cu. ft. is preferred.

A segmented regeneration gas distributor grid 50 positioned in the lower cross-sectional area of the regeneration vessel 42 is provided as shown in FIG. 7 and is adapted to control the flow of regeneration gas passed to any given vertical segment of the catalyst bed above it. In this arrangement, it has been found that even with the generally horizontally circulating mass of catalyst, the flow of regeneration gas is generally vertically upwardly through the mass of catalyst particles so that regeneration gas introduced to the catalyst bed by any given grid segment or portion thereof may be controlled by grid openings made available and the air flow rate thereto. Thus, oxygen containing combustion gases after contact with catalyst in the regeneration zone are separated from entrained catalyst particles by the cyclonic means provided and vertically spaced above the bed. The cyclone combinations diagrammatically represented in FIG. 1 are intended to correspond to that represented in FIG. 2. Catalyst particles separated from the flue gases passing through the cyclones are returned to the mass of catalyst below by the plurality of provided catalyst diplegs.

As mentioned above, regenerated catalyst withdrawn by funnel 40 is conveyed by standpipe 6 to the hydrocarbon conversion riser 4.

The regenerator system shown in FIGS. 7 and 8 is of a type originally designed for producing a flue gas that contains a substantial concentration of carbon monoxide along with carbon dioxide. In fact, a typical $CO_2/CO$ ratio is about 1.2 (i.e., in the absence of a CO-oxidation promoter).

Other regenerator designs for FCC units have been proposed A number of these utilize more than one regeneration zone. It is contemplated that the present invention will have a salutary effect on emissions with most, if not with all regenerators.

EXAMPLES

This invention will now be illustrated by example, which illustration is not to be construed as limiting the scope of the invention, said scope being determined by this entire specification including appended claims.

Examples 1-7, inclusive, illustrate preparation of a catalyst additive according to this invention.

EXAMPLE 1

Catalyst Additive 1 (CA 1) was prepared by aqueous ion exchange of a $NH_4$-ZSM-5 extrudate having a $SiO_2/Al_2O_3$ ratio of about 70/1. The zeolite was exchanged at 85° C. using a 0.1 N copper acetate solution at a ratio of 1 g zeolite per 10 ml solution; the pH of the exchange solution was 5. After two hours with occasional stirring, the zeolite was filtered and thoroughly washed with distilled water. The exchange, filter, and wash procedure was repeated two additional times. The catalyst was then air-dried at 150° C. Prior to testing, it was ground and sized to 120/400 mesh. An elemental analysis showed 4.6 wt% Cu.

EXAMPLE 2

Catalyst Additive 2 (CA 2) was prepared by aqueous ion exchange of a silica-alumina bound ZSM-5 having a $SiO_2/Al_2O_3$ ratio of about 26/1. The bound ZSM-5 was obtained in a spray dried form, suitable for direct use in FCC applications, and consisted of 75% binder/25% ZSM-5. The ion exchange procedure was carried out using copper acetate solution as described for CA 1, as was the drying. An elemental analysis showed 2.2 wt% Cu.

EXAMPLE 3

Catalyst Additive 3 (CA 3) was prepared by treating CA 2 with an aqueous solution of zirconium acetate by the method of incipient wetness. The additive was then dried at 150° C. for 2 hours, followed by air calcination at 538° C. for 4 hours. An elemental analysis showed 2.2 wt% Cu and 12 wt% Zr.

EXAMPLE 4

Catalyst Additive 4 (CA 4) was prepared by treating CA 2 with an acidified aqueous solution of titanium tetramethoxide by the method of incipient wetness. The additive was dried and calcined as for CA 3. An elemental analysis showed 2.2 wt% Cu and 8 wt% Ti.

EXAMPLE 5

Catalyst Additive 5 (CA 5) was prepared by treating a spray dried, silica-alumina bound ZSM-5 material (that described as the precursor material in preparing CA 2 with an aqueous cosolution of both copper nitrate and titanium tetramethoxide by the method of incipient wetness. The additive was then dried and calcined as for CA 3. An elemental analysis showed 3.3 wt% Cu and 4.6 wt% Ti.

EXAMPLE 6

Catalyst Additive 6 (CA 6) was prepared by treating a spray dried, silica-alumina binder (analogous to that used in the precursor material for CA 2 except that no ZSM-5 was present) with a solution of copper nitrate by the method of incipient wetness, followed by drying at 150° C. for 2 hours and air calcination at 538° C. for 4 hours. An elemental analysis showed 3.4 wt% Cu.

EXAMPLE 7

Catalyst Additive 7 (CA7) was prepared by treating CA6 with an acidified aqueous solution of titanium tetramethoxide by the method of incipient wetness. The additive was dried and calcined as for CA6. An elemental analysis showed 3.4 wt% Cu and 5.5 wt% Ti.

EXAMPLE 8

Figure 1B:
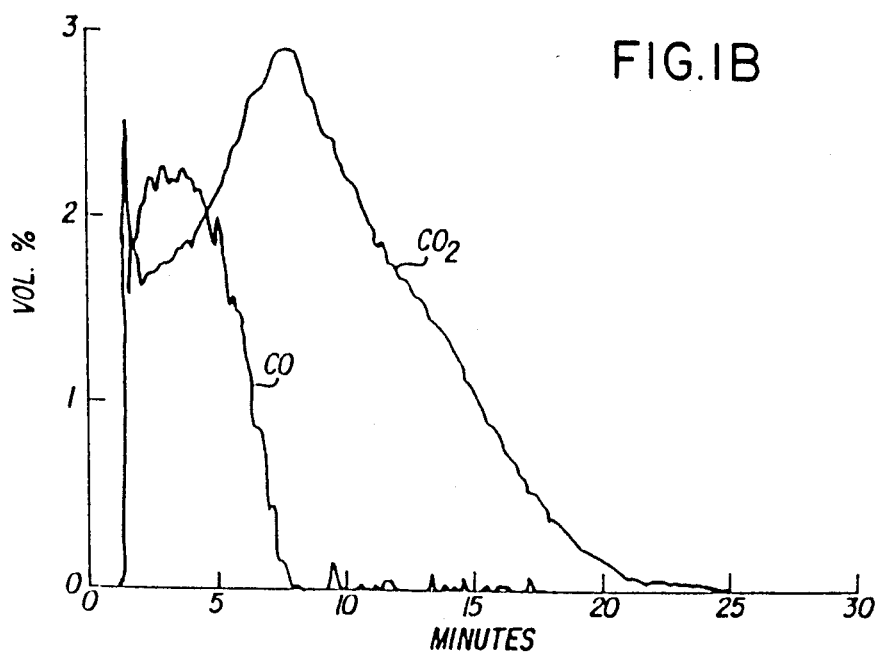

10 g of coked commercial FCC catalyst (0.71% C, 320 ppm N) from a refinery was regenerated in a semi-batch mode in a fluidized bed unit at 700° C. using 400 cc/min of a $N_2/O_2$ mixture to achieve a final $O_2$ concentration of 3 vol.%. Effluent $NO_x$, $CO/CO_2$, and $O_2$ levels were continuously monitored using a chemiluminescent analyzer, non-dispersive infrared analyzers, and a solid state electrochemical sensor, respectively. The effluent stream was dried with a membrane drier prior to entering the analytical train. The effluent species profiles observed during the coked FCC regeneration, in the absence of additive particles, are shown in FIGS. 1(A) and 1(B) of the drawing. The peak $NO_x$ and CO emissions are given in Table I.

Identical experiments to that above were then repeated with fresh batches of coked FCC catalyst to which was added CA 1 at loadings of from 0.125 to 28 wt% based on the total FCC catalyst bed. Both $NO_x$ and CO emissions were significantly reduced during these catalyst regenerations, as shown graphically in FIGS. 2 and 3 for CA 1 additive loadings of 0.125 and 1.1 wt% and as tabulated in Table I. Both the peak and integrated $NO_x$ emissions were reduced across the entire range of CA 1 loadings; however, the primary benefit is achieved once the additive loading reaches about 1 to 2 wt%, as shown in FIGS. 4 and 5. The efficacy of CA1 for $NO_x$ and CO removal was found to be retained after undergoing additional regeneration cycles.

TABLE I

| EFFECT OF Cu-ZSM-5 ON $NO_x$ AND CO EMISSIONS | | |
|---|---|---|
| Run | Peak $NO_x$ (ppm) | Peak CO (vol %) |
| Coked FCC Catalyst with no Additive | 301 | 2.1 |
| Coked FCC Catalyst with 0.125 wt % CA1 | 128 | 1.2 |
| Coked FCC Catalyst with 1.1 wt % CA1 | 92 | 0.2 |

EXAMPLE 9

Coked commercial FCC catalyst (0.92% C, 265 ppm N) which contained 1.5 ppm Pt (present as commercial CO combustion promoter) was regenerated at 700° C. in a steady state mode using a fluidized bed unit. In this set of experiments, the coked FCC catalyst was continuously fed to the regenerator, while regenerated catalyst (greater than 90% C burnoff) was continuously withdrawn from the bed to maintain a constant bed of about 10 g of catalyst; the FCC catalyst feed and withdrawal rate was 1 g/min. The fluidizing gas was a $N_2/O_2$ mixture fed at 400 cc/min. The steady state flue gas $O_2$ content was 4.7 vol. %. The steady state $NO_x$ concentration in the flue gas was 680 ppm.

Identical experiments to that above were then repeated, except CA 2 was added to the coked FCC catalyst at loadings of 0.5 to 2 wt% based on the total FCC catalyst inventory. Significant $NO_x$ reductions were achieved by adding the CA 2, as shown in FIG. 6. Consistent with the behavior described in Example 8, the primary benefit of using the additive is realized once a loading of about 1 wt% is reached. Of note is the fact that these significant $NO_x$ reductions were achieved under excess $O_2$ conditions and in the presence of a Pt oxidation promoter, both of which tend to exacerbate $NO_x$ emissions in FCC regenerators.

EXAMPLE 10

10 g of coked commercial FCC catalyst (0.92% C, 265 ppm N) and containing 1.5 ppm Pt present as commercial CO combustion promoter was regenerated in a semi-batch mode using a fluidized bed under identical operating conditions as given in Example 8. The peak $NO_x$ emission measured in the flue gas was 570 ppm.

An identical experiment to that above was carried out except that CA 3 was added to the FCC catalyst bed at a loading of 5 wt%. The peak $NO_x$ emission dropped to 86 ppm, a reduction of 85%, while the integrated $NO_x$ emission dropped 79% relative to the unadditized case.

EXAMPLE 11

10 g of coked commercial FCC catalyst (0.92% C, 265 ppm N) and containing 1.5 ppm Pt present as commercial CO combustion promoter was regenerated in a semi-batch mode using a fluidized bed under identical operating conditions as given in Example 8. The peak $NO_x$ emission measured in the flue gas was 570 ppm.

An identical experiment to that above was carried out except that CA 4 was added to the FCC catalyst bed at a loading of 5 wt%. The peak $NO_x$ emission dropped to 102 ppm, a reduction of 82%, while the integrated $NO_x$ emission dropped 77% relative to the unadditized case.

EXAMPLE 12

10 g of coked commercial FCC catalyst (0.92% C, 265 ppm N) and containing 1.5 ppm Pt present as commercial CO combustion promoter was regenerated in a semi-batch mode using a fluidized bed under identical operating conditions as given in Example 8. The peak $NO_x$ emission measured in the flue gas was 570 ppm.

An identical experiment to that above was carried out except that CA 5 was added to the FCC catalyst bed at a loading of 5 wt%. The peak $NO_x$ emission dropped to 194 ppm, a reduction of 66%, while the integrated $NO_x$ emission dropped 63% relative to the unadditized case.

EXAMPLE 13

10 g of coked commercial FCC catalyst (0.92% C, 265 ppm N) and containing 1.5 ppm Pt present as commercial CO combustion promoter was regenerated in a semi-batch mode using a fluidized bed under identical operating conditions as given in Example 8. The peak $NO_x$ emission measured in the flue gas was 570 ppm.

An identical experiment to that above was carried out except that CA 6, an additive not containing a ZSM-5 component, was added to the FCC catalyst bed at a loading of 5 wt%. The peak $NO_x$ emission was 533 ppm, indicating a marginal reduction of 6%, while the integrated $NO_x$ showed a drop of only 12% relative to the unadditized case. This result clearly demonstrates the desirability of using an additive having a ZSM-5 component to achieve an unambiguous $NO_x$ reduction benefit.

EXAMPLE 14

10 g of coked commercial FCC catalyst (0.92% C, 265 ppm N) and containing 1.5 ppm Pt present as commercial CO combustion promoter was regenerated in a semi-batch mode using a fluidized bed under identical operating conditions as given in Example 8. The peak $NO_x$ emission measured in the flue gas was 570 ppm.

An identical experiment to that above was carried out except that CA 7, an additive not containing a ZSM-5 component, was added to the FCC catalyst bed at a loading of 5 wt%. The peak $NO_x$ emission was 575 ppm, while the integrated $NO_x$ emission showed a slight, 4%, increase relative to the unadditized case. This result clearly indicates no beneficial effect of using CA7, an additive analogous to CA 5 except having no ZSM-5 component.

The Examiner's attention is called to U.S. patent application Ser. No. 07/279,613, filed on Dec. 5, 1988, which describes and claims a zeolitic copper catalyst composition containing a steam stabilizing amount of titanium or zirconium compound. The entire disclosure of this patent application is incorporated herein by reference as if fully set forth.

Another, particularly preferred method for preparing the catalyst (or additive) of this invention comprises intimately mixing, such as by extruding, the zeolite with titania binder, and impregnating the product with a solution of copper and cerium or copper and yttrium salts, followed by drying and calcining. This particularly preferred method will now be illustrated by examples.

EXAMPLE 15

Catalyst Additive 8 (CA 8) was prepared from $\frac{1}{8}''$ extrudates of 65% ZSM-5 (26:1 $SiO_2/Al_2O_3$) / 35% $TiO_2$ (99% anatase). The $TiO_2$ was a high quality commercial grade obtained from Pfaltz and Bauer (Cat. #T13399). The extrudate was air calcined at 700° F. for 4 hours, followed by an ammonium ion exchange to convert the zeolite to the $NH_4$-ZSM-5 form.

The extrudate was then Cu-exchanged using a copper acetate solution, dried at 150° C., and air calcined at 538° C. for 4 hours. An elemental analysis showed 2.7 wt% Cu. Prior to testing for $NO_x$ abatement, the catalyst was ground and sized to 140/400 mesh.

This catalyst preparation contained no rare earth stabilizer, and is included only as a control example for comparison purposes.

example 16

Catalyst Additive 9 (CA 9) was prepared from a portion of the same $NH_4$-ZSM-5 extrudate described in Example 15.

To prepare the catalyst, the extrudate was treated with a co-solution of cerium nitrate and copper nitrate by the method of incipient wetness, followed by drying at 150° C. and calcination at 500° C. for 6 hours. The catalyst additive of this example contained 2.3 wt% cerium (Ce).

EXAMPLE 17

Catalyst Additive 10 (CA 10). For this example, the catalyst was prepared in the same manner as in Example 16 except that it was prepared using sequential impregnation and calcination with Ce, then with Cu, using the identical compounds and conditions. The $NO_x$ abatement results for both the fresh and steamed catalysts (tested using the procedures described above) are summarized in Table II for 5 wt% catalyst loadings in the FCC bed.

EXAMPLE 18

Catalyst Additive 11 (CA 11) For this example the catalyst was prepared in the same manner as in Example 15, except that the extrudate was treated with a co-solution of yttrium nitrate and copper nitrate instead of the solution of cerium and copper. The catalyst additive of this example contained 2.3 wt% yttrium (Y).

EXAMPLE 19

In this example, the additives prepared in Examples 15-18 were individually evaluated for fresh $NO_x$ abatement activity by observing the reduction in peak $NO_x$ emissions when added at 0.5 to 5 wt% loadings to a Pt-doped (1.5 ppm) spent FCC catalyst from a refinery. The spent catalyst was burned clean in a semi-batch, fluidized bed regeneration unit at 1320° F. using 400 cc/min. of a $O_2/N_2$ mixture to achieve a final flue gas $O_2$ concentration of 3 vol.%. Significant reductions in $NO_x$ were achieved with all the fresh catalysts, as shown in the Table II for 2 wt% catalyst loadings.

The additives were then subjected to hydrothermal treatment at 760° C. for 4 hours at 1 atmosphere steam and tested for retention of $NO_x$ activity using the above regeneration procedure. The results are given in the Table II.

TABLE II

EXAMPLE 19

| Catalyst Additive | Condition | Peak $NO_x$, ppm | $NO_x$ Red'n, % (P/I) |
|---|---|---|---|
| None | — | 570 | — |
| CA 8 (Ex. 15) | Fresh | 47 | 92/89 |
| (Control) | Steamed | 202 | 65/58 |
| CA 9 (Ex. 16) | Fresh | 49 | 91/89 |
| (+Ce-Stabilized) | Steamed | 166 | 71/66 |
| CA 10 (Ex. 17) | Fresh | 47 | 92/89 |
| (+Ce-Stabilized) | Steamed | 207 | 64/59 |
| CA 11 (Ex. 18) | Fresh | 35 | 94/91 |
| (+Y-Stabilized) | Steamed | 150 | 74/66 |

As shown by the data in Table II, all of the unsteamed preparations were very effective, reducing the $NO_x$ concentration by at least 89% measured by the integrated (I) curve, and at least 91% measured by the maximum peak height (P). Enhanced retention of activity after steam treatment is clearly evident for CA 9 and CA 11, which were prepared by simultaneous introduction of copper and rare earth cations, whereas CA 10 of Example 17, prepared by sequential introduction of copper and rare earth cation with intermediate drying and calcining, appears to give no significant enhancement of retention on steaming when compared with the rare-earth free control CA 8. It is not understood why this particular procedure defeats the stabilizing effect of the rare earth inclusion. While not wishing to be bound by theory, the result suggests that sequential inclusion first with copper, followed by calcining, interferes with the advantageous association of the copper zeolite and the rare earth. In any case, at least for cerium and the particular ZSM-5 used in Example 17, it is essential for purposes of this invention not to use the sequential procedure of Example 17.

In general, it is preferred to add the copper and rare earth by impregnation of the matrix-bound zeolite with an aqueous solution containing both of these ions. This step is followed by drying and calcining at about 500° C. for about 1-10 hours. Alternative procedures may be evaluated by simple testing, and used in this invention if advantageous.

In the particularly preferred embodiment of this invention, the zeolite is combined with a matrix consisting predominantly of a source of titania, a source of zirconia, or a mixture thereof, and shaped to provide particles of about the same size as the host catalyst, by any method known to those skilled in the art, the method per se not being considered a part of the present invention. Non-limiting sources of titania, for example, include titanium dioxide (e.g. Anatase), hydrated titanium dioxide, and metatitanic acid. The zeolite may be mulled with the titania or precursor thereof, followed by extrusion or spray-drying, and the resultant shaped particles calcined to provide a composition containing about 10 to 90 parts of zeolite and 90 to 10 parts by weight of titania or zirconia matrix. Other means for preparing the zeolite in a titania matrix are disclosed in U.S. Pat. No. 4,793,813 to Kato et al., incorporated herein by reference for said disclosure. The calcined shaped particles are then treated by ion-exchange or impregnation with a source of copper ions and rare earth ions, these preferably being in aqueous solution as the chloride, nitrate or acetate salts, followed by calcination to prepare the catalyst additive.

Although the preferred embodiment of this invention has been illustrated by examples in which cerium or yttrium nitrate is used as a source of rare earth stabilizer, a wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available. One such solution contains the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45-56% by weight, cerium 1-2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the additive catalyst of this invention, although lanthanum, neodymium, praseodymium, samarium and gadolinium as well as mixtures of rare earth cations containing a predominant amount of one or more of the above cations are preferred. In general, it is contemplated to add at least sufficient rare earth, such as about 1 to about 10 wt% of the total additive, along with copper, to the matrix-bonded zeolite to provide a significant and measurable increase in steam stability without substantial loss of catalytic activity of the unsteamed sample. Although it is difficult to specify the exact rare earth content needed for the desired effect, a few simple laboratory tests can determine said amount regardless of the zeolite chosen, or of the particular rare earth or mixture thereof used.

Although the description of this invention as given above is directed to the use in catalytic cracking of rare-earth stabilized copper catalyst particles prepared from a crystalline zeolite dispersed in a titania or zirconia matrix, it is to be understood that such stabilized compositions in particulate or other form also may be used for other applications or processes in which exhaust gases that contain noxious oxides of nitrogen are formed. Non-limiting examples include the treatment of exhaust gases from stationary power plants, from incinerators, from automotive vehicles, and from certain chemical plants. Depending on the composition of the exhaust gas, the catalyst may be used alone to reduce the $NO_x$ content of the exhaust, or it may be used with co-fed ammonia, CO or hydrocarbon, to effect selective catalytic reduction (SCR). Further description of useful shapes of the catalyst and their application is found in U.S. Pat. No. 4,798,813 to Kato et al., incorporated herein by reference for said disclosure.

What is claimed is:

1. In the process by which a hydrocarbon feed is catalytically cracked in a cracking unit comprising a cracking zone operating in the absence of added hydrogen, a catalyst regeneration zone, and a circulating inventory of solid acidic cracking catalyst which acquires while in the cracking zone a deposit of coke, said coked catalyst while in the regeneration zone being converted to regenerated catalyst with the formation of a flue gas comprising noxious nitrogen oxides, the improvement which comprises:

incorporating with each 100 parts by weight of said circulating catalyst inventory about 0.1 to about 45 parts of additive particles comprising a crystalline zeolite in a titania or zirconia matrix, said crystalline zeolite having a silica to alumina ratio of about 20 to about 100 and a pore size greater than 5 angstroms, said additive particles containing copper metal and/or ions equivalent to at least 0.25 mole of CuO for each mole of $Al_2O_3$ in said zeolite and a steam-stabilizing amount of one or more rare earth metal compounds, thereby reducing the content of noxious nitrogen oxides in said flue gas.

2. The improvement described in claim 1 wherein said crystalline zeolite has the crystal structure of ZSM-5, ZSM-11, ZSM-12, ZSM-22, ZSM-23, ZSM-35, ZSM-38, ZSM-48, mordenite, dealuminated Y, or Zeolite Beta, incorporated in a titania matrix.

3. The process described in claim 2 wherein said catalytic cracking unit is a fluid catalytic cracking unit, and wherein said zeolite has the crystal structure of ZSM-5.

4. The process described in claim 2 wherein about 0.1 to about 11 parts by weight of said additive particles are incorporated with each 100 parts of cracking catalyst.

5. The process described in claim 3 wherein about 0.1 to 10 parts by weight of said additive particles are incorporated with each 100 parts of cracking catalyst.

6. The process described in claim 1 wherein said circulating inventory of cracking catalyst contains a platinum group metal CO-combustion promoter.

7. The process described in claim 2 wherein said circulating inventory of cracking catalyst contains a platinum group metal CO-combustion promoter.

8. The process described in claim 3 wherein said circulating inventory of cracking catalyst contains a platinum group metal CO-combustion promoter.

* * * * *